(12) United States Patent
Keeler, Jr. et al.

(10) Patent No.: US 6,502,130 B1
(45) Date of Patent: Dec. 31, 2002

(54) SYSTEM AND METHOD FOR COLLECTING CONNECTIVITY DATA OF AN AREA NETWORK

(75) Inventors: Charles E. Keeler, Jr., Cambridge, VT (US); Tracy L. Lord, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/321,059

(22) Filed: May 27, 1999

(51) Int. Cl.$^7$ .......................................... G06F 15/173
(52) U.S. Cl. ........................ 709/223; 709/220; 709/224; 709/245
(58) Field of Search ................................ 709/220, 223, 709/224, 245

(56) References Cited

U.S. PATENT DOCUMENTS

| 4,937,825 | A | | 6/1990 | Ballard et al. ............... 371/20.1 |
|---|---|---|---|---|
| 5,495,479 | A | | 2/1996 | Galaand et al. ................ 370/60 |
| 5,526,489 | A | * | 6/1996 | Nilakantan et al. .......... 709/228 |
| 5,539,881 | A | | 7/1996 | Hunt et al. ............ 395/200.02 |
| 5,559,955 | A | | 9/1996 | Dev et al. ............... 395/182.02 |
| 5,588,119 | A | * | 12/1996 | Vincent et al. .............. 709/223 |
| 5,606,664 | A | | 2/1997 | Brown et al. ............. 395/200.1 |
| 5,613,096 | A | | 3/1997 | Danknick .................... 395/500 |
| 5,710,885 | A | * | 1/1998 | Bondi ......................... 709/224 |
| 5,978,568 | A | * | 11/1999 | Abraham et al. ....... 395/200.54 |
| 6,003,074 | A | * | 12/1999 | Vasconcellos ............... 709/220 |
| 6,122,276 | A | * | 9/2000 | Boe et al. .................... 370/389 |
| 6,223,218 | B1 | * | 4/2001 | Iijima et al. ................ 709/221 |
| 6,360,262 | B1 | * | 3/2002 | Guenthner et al. ......... 709/226 |
| 6,389,464 | B1 | * | 5/2002 | Krishnamurthy et al. ... 709/220 |
| 6,405,248 | B1 | * | 6/2002 | Wood ......................... 709/223 |

* cited by examiner

Primary Examiner—Saleh Najjar
(74) Attorney, Agent, or Firm—Connolly Bove Lodge & Hutz LLP.

(57) ABSTRACT

A system and method which collects dynamic connectivity data from an area network interconnecting multiple computing devices. The connectivity data identifying the address of equipment connected to the network is combined with static network information such as the user's identity stored in the system data bases to relate the connectivity data to the respective users and their respective privileges. The system permits the identification of users on the network for purposes of billing or for diagnosis purposes using standard database search capabilities.

21 Claims, 7 Drawing Sheets

SYSTEM AND METHOD FOR COLLECTING CONNECTIVITY DATA OF AN AREA NETWORK

BACKGROUND OF THE INVENTION

The present invention relates to the network management of local and wide area networks. Specifically, a system and method are provided which will identify connections of users to a network for purposes of billing and diagnosing failures on the network.

The power of computing has been greatly expanded by the ability to network individual users with other digital devices located in the same or different facilities. In a typical local area or wide area network system, users are connected and disconnected from the network on an ongoing basis. The network topology therefore changes, so that it becomes increasingly more difficult to identify the users of a network and their particular port connection to the network. In order to effectively diagnose problems on the network, as well as provide appropriate billing to users of the network, it is necessary to know, on at least a monthly basis, user port connections.

Network trouble shooting is typically done by the technician employees of the network owner. When diagnosing problems on the network, a networking problem may be traced to a particular physical address of a device connected to the network. The identification of the user of the equipment having to the physical address involved in a network problem, however, is not immediately available. Locating a network port location of a particular user is even more difficult in an environment where users may move from office to office, or even building to building over time, so that connectivity information is constantly changing. Further, various sources of user information are often in different data bases, and not correlated to a user's network port connection. For instance, in a typical wide area network configuration, separate data bases may be maintained, one which identifies an employee's organizational information, i.e., department number, telephone number, and employee number, etc., and other data bases which may include authorization data and address information for the users, which are not linked to each other, making it difficult to learn all facts about a user's connection to the network.

Accordingly, the present invention seeks to merge user connectivity data which is dynamic, in that it changes from day to day, with more static data located in various data bases which are maintained by the network manager.

SUMMARY OF THE INVENTION

The invention is directed to a system and method which collects dynamic connectivity data from an area network interconnecting multiple computing devices. The dynamic connectivity information is combined in a data warehouse with static network information, relating to the various users and their privileges. The combined data stored in a data warehouse permits the identification of each user and the various privileges of the user, correlated to its connection port.

The productivity data is collected using commands in the simple network management protocol (SNMP). SNMP commands query all network devices such as hubs, routers, and gateways to other networks to obtain port connectivity information such as the identity of the ports being used by each network user.

The dynamic connectivity data may be combined in a single data warehouse with static user information from other data bases, correlated to the collected dynamic information. Thus, every user of the system may be identified along with ports in use by the user, and any privileges which exist for the user to use other connected devices such as gateways to other networks.

DETAILED DESCRIPTION OF THE INVENTION

Figure 1:
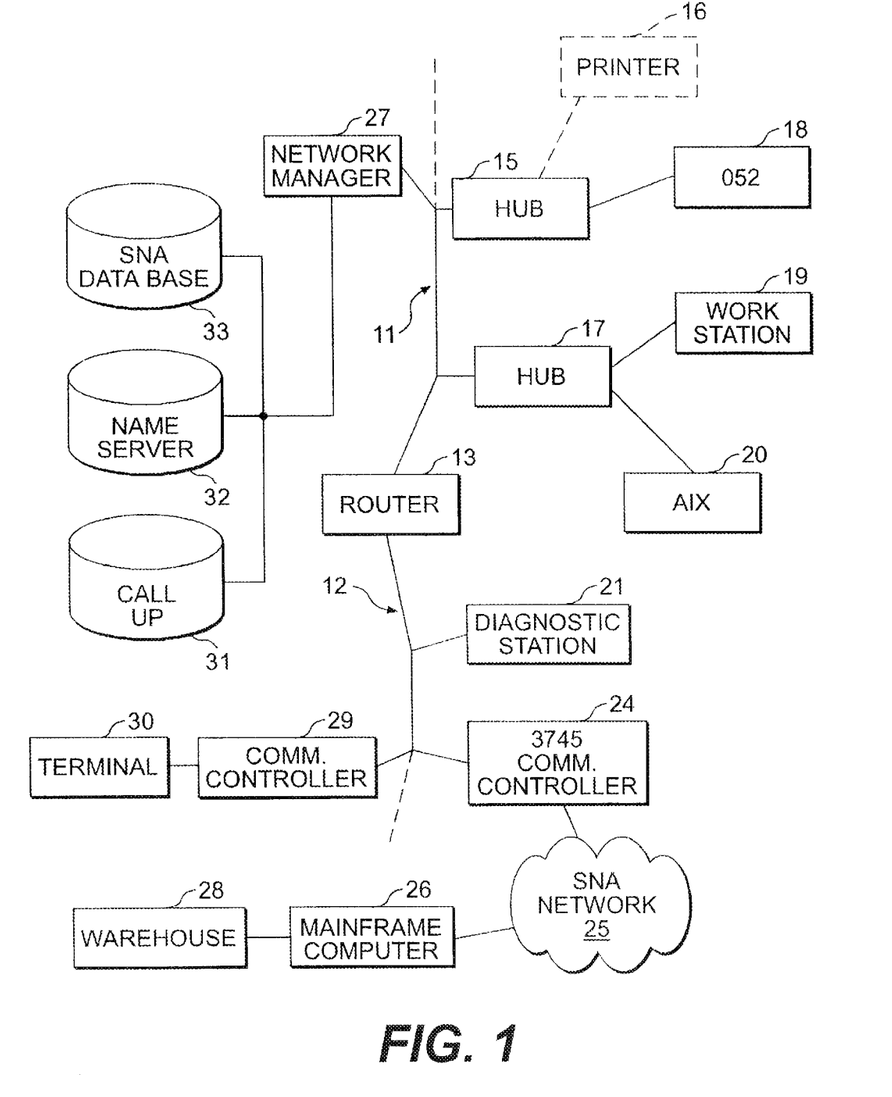
FIG. 1 is an overall architectural representation of a network.

The area network illustrated in FIG. 1 includes a first segment 11, shown as a ring, connected to a first hub 15 and a second hub 17. The illustrated hubs 15, 17 in the embodiment of FIG. 1 are standard IBM 8250 and 8230 hubs which connect a plurality of workstations, such as stand alone computers 18 and 19 to the network.

The first segment, 11 is connected by the router 13 to a second segment 12. The first segment 11 may reside in a given building or facility, whereas the second segment 12 may be in another building or facility. The router, as is known in standard network architecture, provides a bridge from the first segment 11 to the second segment 12 for transferring data between segments 11 and 12.

Segment 12 is connected to a controller 24, such as an IBM 3745 communications controller which comprises a gateway to a main frame SNA network 25. Communications over the SNA network 25 utilize the SNA protocol, and the identity of any workstation having privileges to communicate over the SNA network 25 is stored as an SNA XID within a table of SNA database 33, along with a physical or MAC address for the authorized workstation. The SNA XID provides the alternative identity of the workstations which is used in the SNA network 25, and a data translation occurs between the SNA XID and the MAC address which is used on the network segment 12 by controller 24.

Other facilities connected to the network of FIG. 1 include a network manager 27, printer 16, dumb terminal 30 and diagnostic terminal 21. In the preferred embodiment, the network manager 27 keeps a router list containing the community name for the router, as well as the router MAC address,which is used in the collection process for obtaining connectivity data from each router.

The system according to FIG. 1 is capable of collecting connectivity data from each of the devices connected to the area network, and merging the connectivity data with static data representing user identities and network privileges maintained in each of the data bases 31, 32 and 33. For instance, the SNA XID data base 33 identifies the physical address in the SNA protocol form of each user (identified by an employee number) that has privileges for communicating over the mainframe SNA network 25 as well as the respective SNA XID. The name server data base 32 maintains a list of all users, according to their employee serial numbers, their TCP/IP addresses, an associated MAC address as well as a machine and node on which the user can be found. Where fields within the name server file contain a customer's name or machine description, a billing field may be provided to identify either a serial number or department number that the machine is registered to. A cable number field contains the cable number that an end user has identified as being connected to his machine.

A CALLUP data base 31 contains the lowest level of information about each user of the network. A field within the CALLUP data base contains the employee's serial number which correlates the information of each record stored in the CALLUP data base to data in the name server data base 32 and SNA data base 33. Each record identifies the employee by name, the division in which the employee works as well as his department. An employee's manager's serial number may also be included in this record.

The system in accordance with FIG. 1 collects the dynamic port connection information for each connection to the network. A user is connected to the network through a network card which has a unique physical, or MAC address. As connections change due to employee relocations, new employees joining the system, and deletion of employees who leave the organization owning the network, periodic updates of connectivity information is necessary so that current connection information is available for billing and diagnostic purposes. As will be described, a system for collecting this dynamic data is provided using a series of SNMP (simple network management protocol) collection components which identify equipment connected to the network by their respective MAC addresses.

The present invention merges the dynamic connection data obtained through the SNMP collection components with the static data in each of the static data bases, and stores the merged data in a data warehouse 28 of a mainframe computer 26 on SNA network 25. The data warehouse 28 provides a data base identifying each connection to a port of the network by employee, employee department and manager, and all other pertinent information for billing purposes. Each record of the data base in data warehouse 28 in a preferred embodiment of the invention may be in the following format:

| Starting Column | Field | Information |
|---|---|---|
| @1 | MACADDR | Network Interface Card (NIC) address - The common key to all the data |
| @15 | SEG | LAN Segment Number of which the MAC ADDR is part |
| @18 | HUB | Intelligent Hub Name that the MAC ADDR was seen on (MACS) |
| @34 | PORT | Port on the Intelligent Hub (MACS) |
| @40 | TERMID | SNA Terminal ID (SNADB) |
| @50 | XID | SNA XID (from VTAM and SNADB) |
| @60 | SNAMNUM | Employee Number of the owner of the SNA TERMID (SNADB) |
| @70 | SNADEPT | Department Number derived from SNAMNUM and CALLUP |
| @80 | IPADDR | TCP/IP Address that was seen on the router (NEWARP) |
| @95 | MACHNAME | TCP/IP machine from the Name Server (NEWNAME) |
| @110 | MANNUM | Employee Number recorded in the Name Server (NEWNAME) |

-continued

| Starting Column | Field | Information |
|---|---|---|
| @120 | NETBMACH | Netbios Machine Name (NETBIOS) |
| @130 | REQSERV | If the machine is a Netbios REQuester or SERVer (NETBIOS) |
| @135 | NBDOMAIN | The Netbios Domain that the machine is part of (NETBIOS) |
| @155 | EMPNAME | The Employee Name derived from SNAMNUM and/or MANNUM (CALLUP) |
| @195 | DEPT | the department number that the employee is part of (CALLUP) |
| @200 | DIV | The Division of the department that the employee is part of (CALLUP) |
| @205 | MACS | FLAG for as to if some of the above data came from MACS file |
| @207 | NEWARP | FLAG for as to if some of the above data came from NEWARP file |
| @209 | VTAM | FLAG for as to if some of the above data came from VTAM file |
| @211 | NETBIOS | FLAG for as to if some of the above data came from NETBIOS file |
| @213 | NEWNAME | FLAG for as to if some of the above data came from NEWNAME file |
| @215 | SNADB | FLAG for as to if some of the above data came from SNADB file |
| @217 | EMPID | Information from the COAX file |
| @219 | PUNAME | Physical Unit Name from the COAX file |
| @228 | COAXPORT | Coax Port |
| @230 | DATE | The last date that any of the above information was seen on the Network |

The above sample record of the data warehouse 28 includes dynamic port data and static user data stored in dedicated fields of the record. The common key to all the data is the MAC address shown in the field beginning with column 1. From this MAC address, through column 39, the dynamic connection data for that particular MAC address is shown. Fields beginning with columns 40, 50, 60 and 70 contain data obtained from the SNA data base 33. Other information such as the corresponding TCP/IP address obtained from a router is shown for a given MAC address.

The static data from the CALLUP data base 31 is shown in fields beginning with column 155 through 204. Flags in locations at 205 through 215 identify whether some of the data came from the MAC address stored in a file of a component on the network, the work file of the name server 32, the SNA data base 33, or from a NETBIOS file. The final field beginning at column 230 identifies the last date that the dynamic connectivity information in the record was found to be on the network.

Using conventional data base management software, the compiled data base in warehouse 28 can be used to identify all connection information for a user. Alternatively, in a diagnostic application, the employee having a connection to the network which appears problematic can be identified.

The dynamic connectivity information is derived from collection routines (components) stored on computer readable mediums running on different computer terminals using the SNMP protocol with OS/2,—TCP/IP operating systems. The collection routines issue SNMP base values which retrieve information on port connections from selected network components such as hubs, routers, and controller interfaces to other networks such as a SNA network. The collection components are part of a data collection program which runs on a periodic basis, such as once a month, to maintain and update the information relating to port usage by the network users.

Each of the devices involved in a connection to the network of FIG. 1 is interrogated for information to derive the identity (MAC address) of users connected to the ports of a device. These collection components include the following:

1. BNGETARP.CMD,
2. GETHUB.CMD, and
3. MAKE HUB.CMD.

Collection component BNGETARP.CMD interrogates data base of LAN network manager 27 of FIG. 1 for the router lists, so that data from each router identified in the lists to can be obtained. Similarly, MAKE HUB.CMD is a collection component to create a list for each of the hubs from which data must be collected.

The foregoing collection components are executed on the OS/2 port charge machine 18 of FIG. 1. Additional to these collection components are components which run on the LAN network manager 27 of FIG. 1, as well as the network AIX processor 20 which is dedicated to organize the data recovered from the collection routines. The routines which run on the AIX processor 20 collect and consolidate the data collected by the OS/2 machine, and parse the data removing duplicates. A further routine residing on the AIX processor 20 executes a set of commands for obtaining the printer connection data for each printer connected to a port of the local area network. The result is a file of collected data which is reformatted, and validated for merging into the data warehouse 28.

Other collection components run on the mainframe machine 26 of the SNA network 25 along with a program available from the International Business Machines Corporation identified as Netview/390. These collection components BTVUFC and CUUSCA, collect the SNA data for identifying users of the SNA network 25 who are connected to ports of the area network. The recovered data includes data specific to the 3745 communication controller 24, along with MAC addresses and SNA resource information for all devices using the 3745 network controller. Additionally, the CUUSCA component obtains port usage information from any 3174 cluster controllers 29 connected to the network.

The identity of each router is maintained within the network manager 27 of the network. The collection routine BNGETARP.CMD acquires a list of routers for the network from the network manager, which has this information compiled as a router list. Once the router list is obtained, BNGETARP.CMD invokes another collection routine, GETARP.CMD which collects from each router the router's media table containing the identity of all MAC addresses for devices which are served by the router, and their corresponding TCP/IP address. The two collection routines BNGETARP.CMD and GETARP.CMD are shown in FIGS. 2 and 3.

Figure 2A:
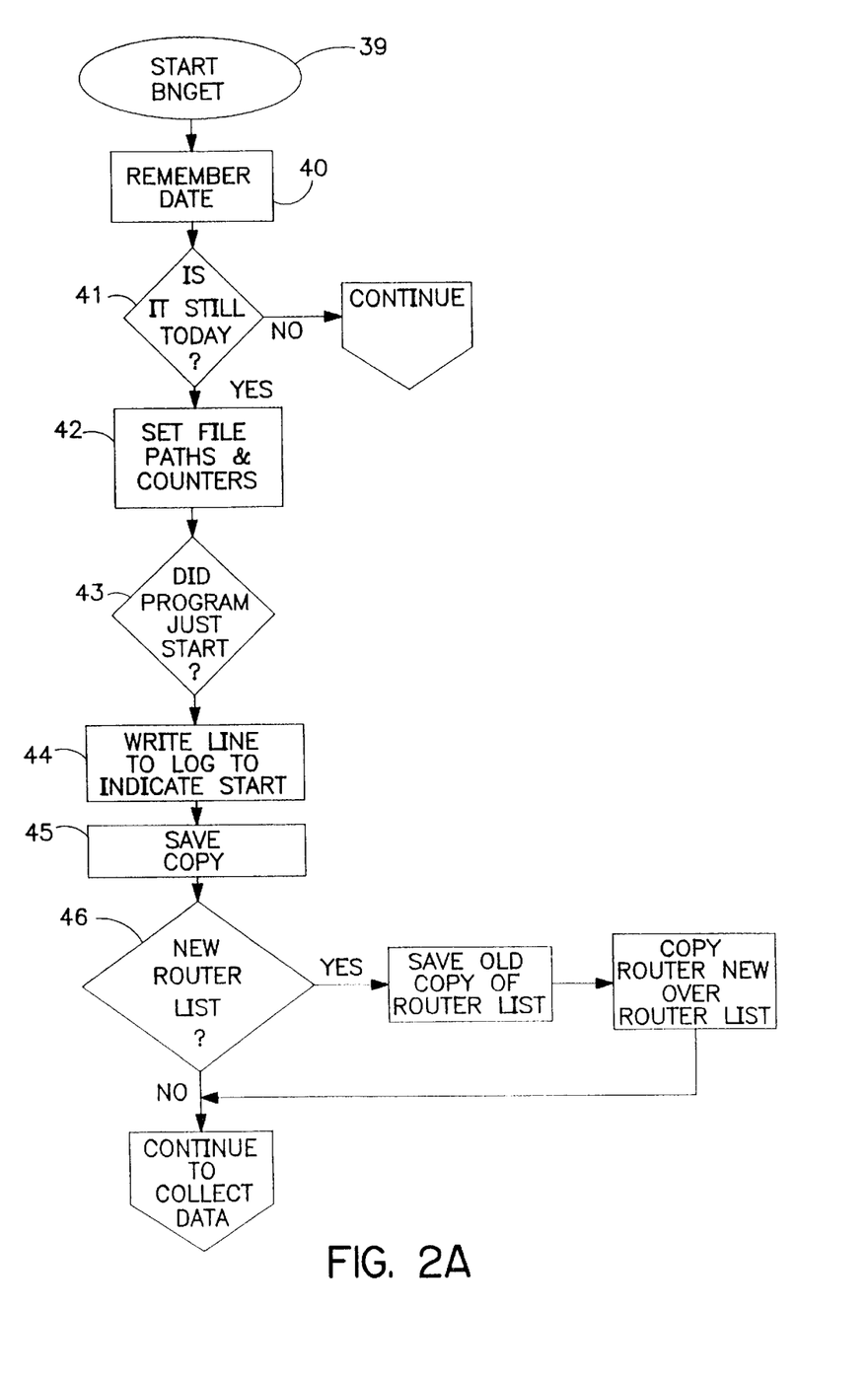
FIG. 2A and FIG. 2B illustrates a collection routine BNGETARP.CMD for identifying routers on the network.
Figure 2B:
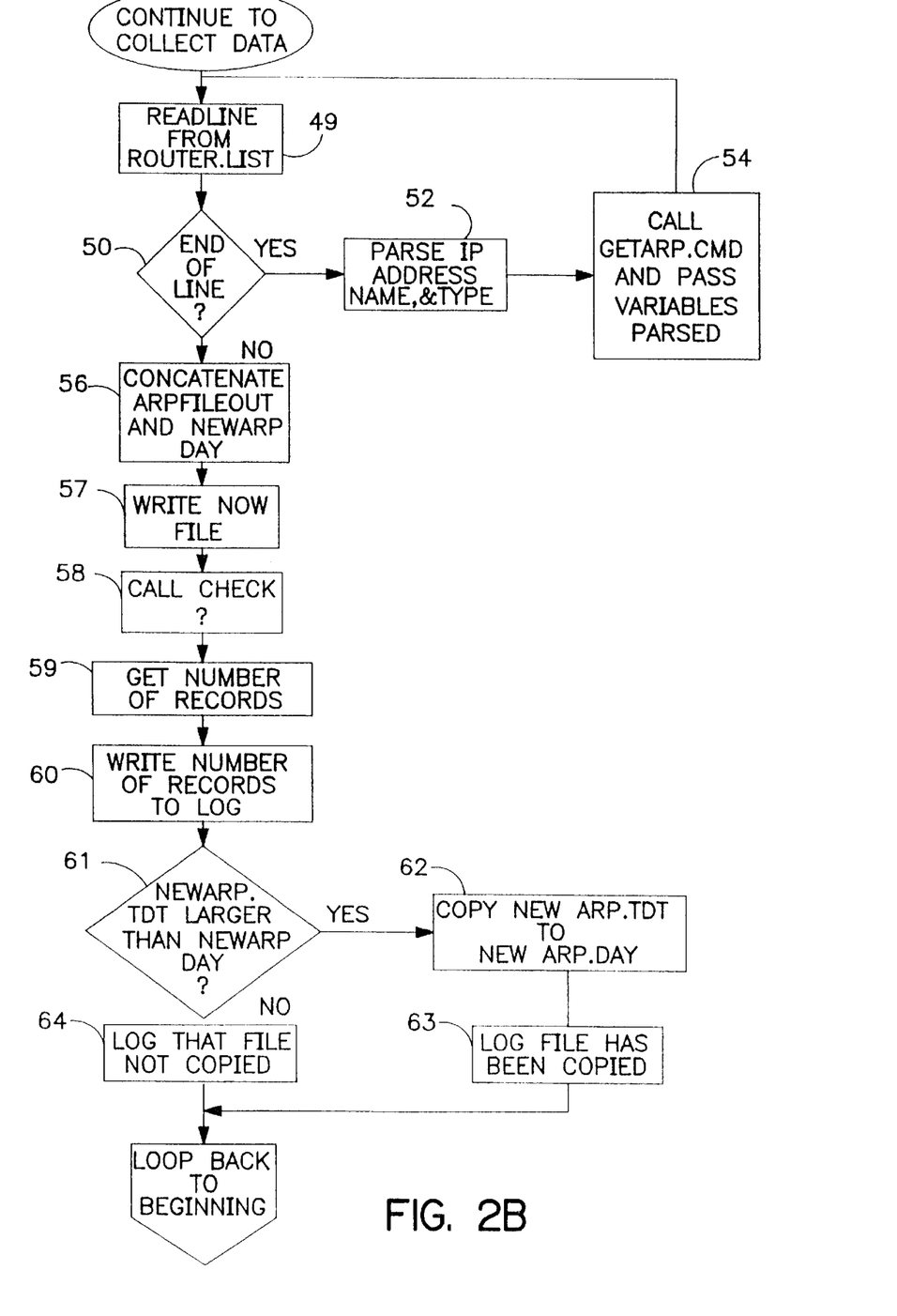
Figure 3:
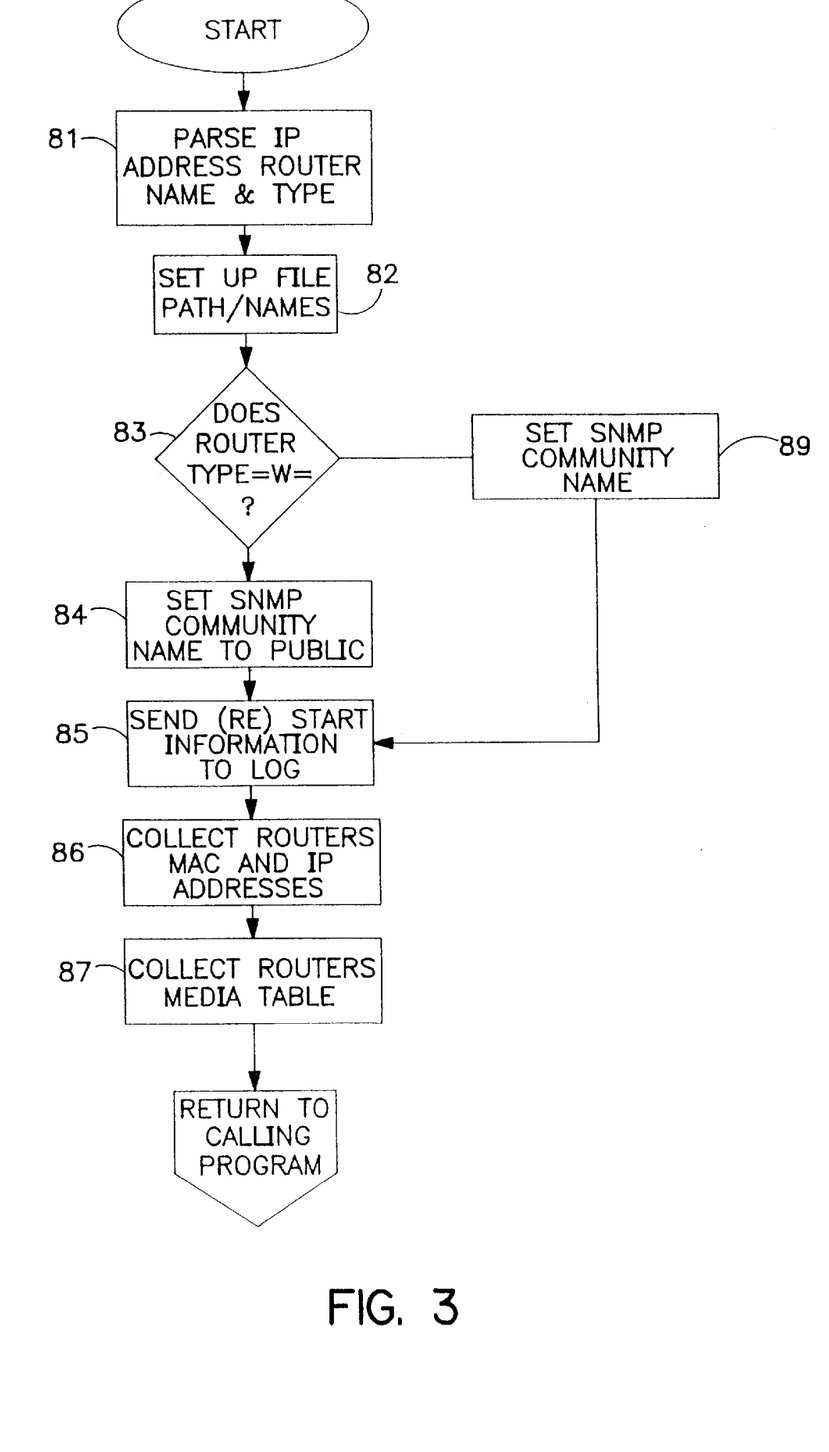
FIG. 3 illustrates the collection routine GET.ARP.CMD for collecting connectivity data from each router.

Referring now to FIG. 2, the beginning of the BNGETARP.CMD collection routine is shown at 40. As the program is run by the OS/2 machine 18, on a periodic basis, steps 39–41 determine when it is time to collect the router information. The various file path counters are set in step 42 to permit the collection process to begin. Steps 43 and 44 determine whether or not the program has been restarted, or whether it is continuing to run from an earlier initiation phase.

Step 46 determines whether or not the information contained in the router list of the network manager has been updated. Steps 47–48 result in a replacement of the old router list with the new router list bearing an update.

The process of collecting MAC addresses and the corresponding TCP/IP addresses from the read router list, begins by calling the collection routine GETARP.CMD 54. The router list is read line by line, beginning in step 49, and the router address, name and type for locating the router is identified in step 52. As will be seen with respect to FIG. 3, the GETARP.CMD collection routine 54 reads from each router identified in the router list the connectivity data comprising MAC addresses and corresponding TCP/IP addresses for all connected devices served by the router.

The results obtained from invoking GETARP.CMD are concatenated and parsed in step 56 to remove duplicates and any gaps which may appear in the data. The new data is written in step 57 as NEWARP.TDT.

The number of records within NEWARP.DAY, NEWARP.TDT and ARPFILE.OUT, which have been compiled from the recovered information, are written to a log 60. If the current value of the NEWARP.TDT information is greater than NEWARP.DAY which was stored previously as determined in 64, NEWARP.TDT is written in step 62, and an indication of the rewriting of NEWARP.TDT is made in step 63. In the event that the copying of NEWARP.TDT to NEWARP.DAY has not been accomplished, step 64 logs that information.

The GETARP.CMD collection routine is shown more particularly in FIG. 3. When invoked, it parses the TCP/IP address, the router name and router type in step 81. The file directory is set up in step 82 prior to recovering the information from each router.

Decision block 83 recognizes a condition where all routers may not be the same, and some may require a different community name in order to execute the SNMP command for interrogating the media tables in the router. Depending on the type of router, steps 84 and 89 will set the appropriate community name in order to recover the information stored in each router media table.

The routine continues by sending the restart information to a log in step 85, and then collects the router internal MAC ID and TCP/IP addresses in step 86. The media table for the router, comprising a table identifying the MAC addresses and TCP/IP addresses of all network devices utilizing the routers are then collected by the OS/2 machine.

Figure 4:
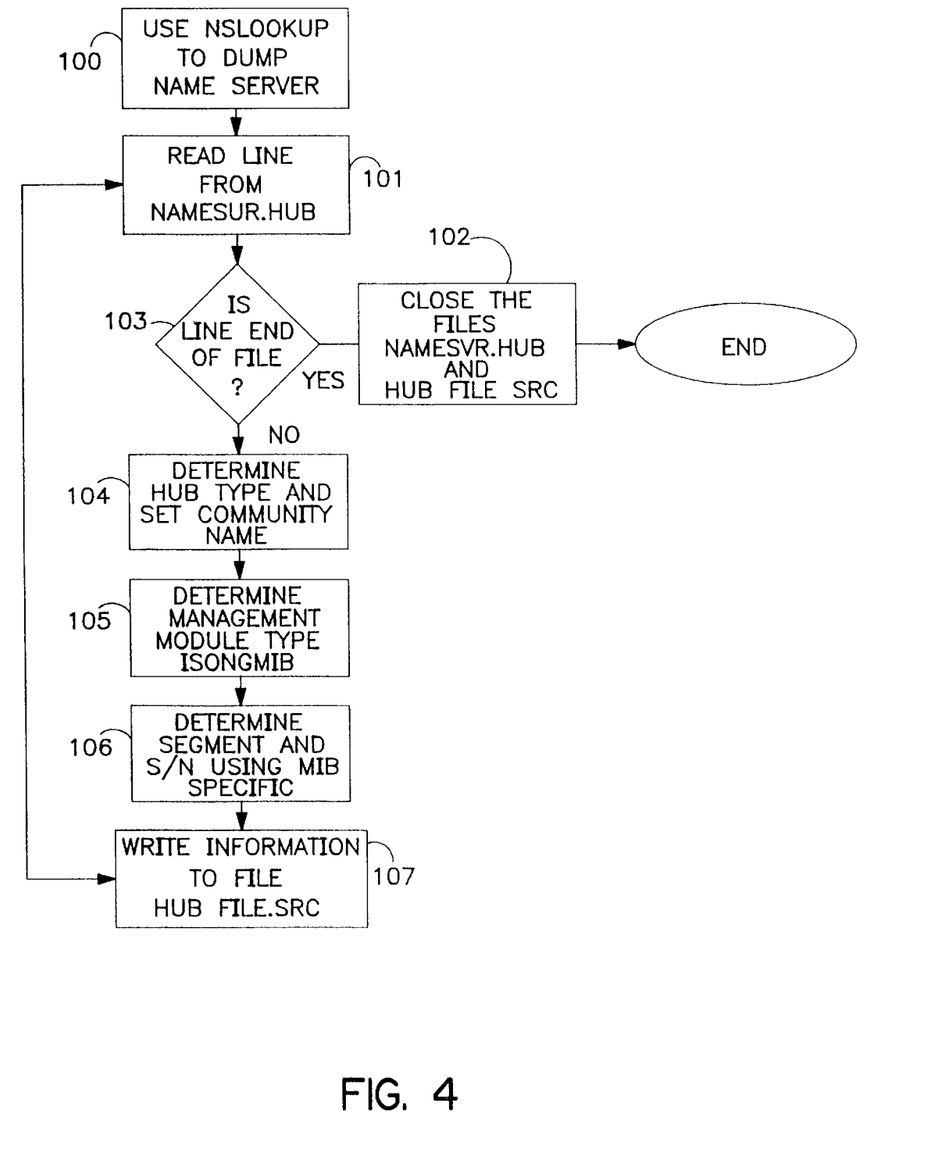
FIG. 4 illustrates the collection routine MAKEHUB.CMD for obtaining hub connectivity data from each network hub.

Other significant port information is obtained using the MAKEHUB.CMD collection routine of FIG. 4. Each of the hubs having an output port connected to a device with a MAC address is interrogated with the MAAEHUB.CMD collection routine, and each user's MAC address connected to the hub is recovered by the OS/2 machine.

In step 100, an operating system command NSLOOKUP is executed in order to obtain a list of hubs which is stored in the name server data base 32 of FIG. 1. The recovered list, representing a dump of name server records, is recovered by the OS/2 machine and stored as NAMESERV.HUB.

From the list of hubs, each line is read in step 101 to identify each hub from which the data is to be recovered. In step 104, the hub type and community name for the hubs are determined from the read lines.

The SNMP management system uses in step 105 an SNMP MIB value to identify a data location within the hub having the segment identification and MAC address of the devices and the respectively connected hub port in step 106. The recovered bit value is written to HUBFILE.SRC in step 107 residing in the OS/2 machine 18.

Thus, following execution of MAC HUB.CMD all of the hubs have been interrogated and the connection data identifying the MAC address connected to each port is written to a file where they can be read or later merged with other information to identify users of ports on the network.

Other collection routines running on the OS/2 machine 18 will recover yet other port connectivity data. Por instance, a NETLMN.CMD collection routine may be used, similar to BNGETARP.CMD and GETHUB.CMD to collect the port data stored in the network manager. THE NETLMN.CMD routine issues a remote SNMP command to the network manager to execute an STL command for obtaining the contents of the network manager table. This information is stored as a file LNMLIST.SRC,and eventually merged with the collected data from other devices on the network. A similar collection routine may be used to collect the MAC address for any printer 16 connected to the network.

Figure 5:
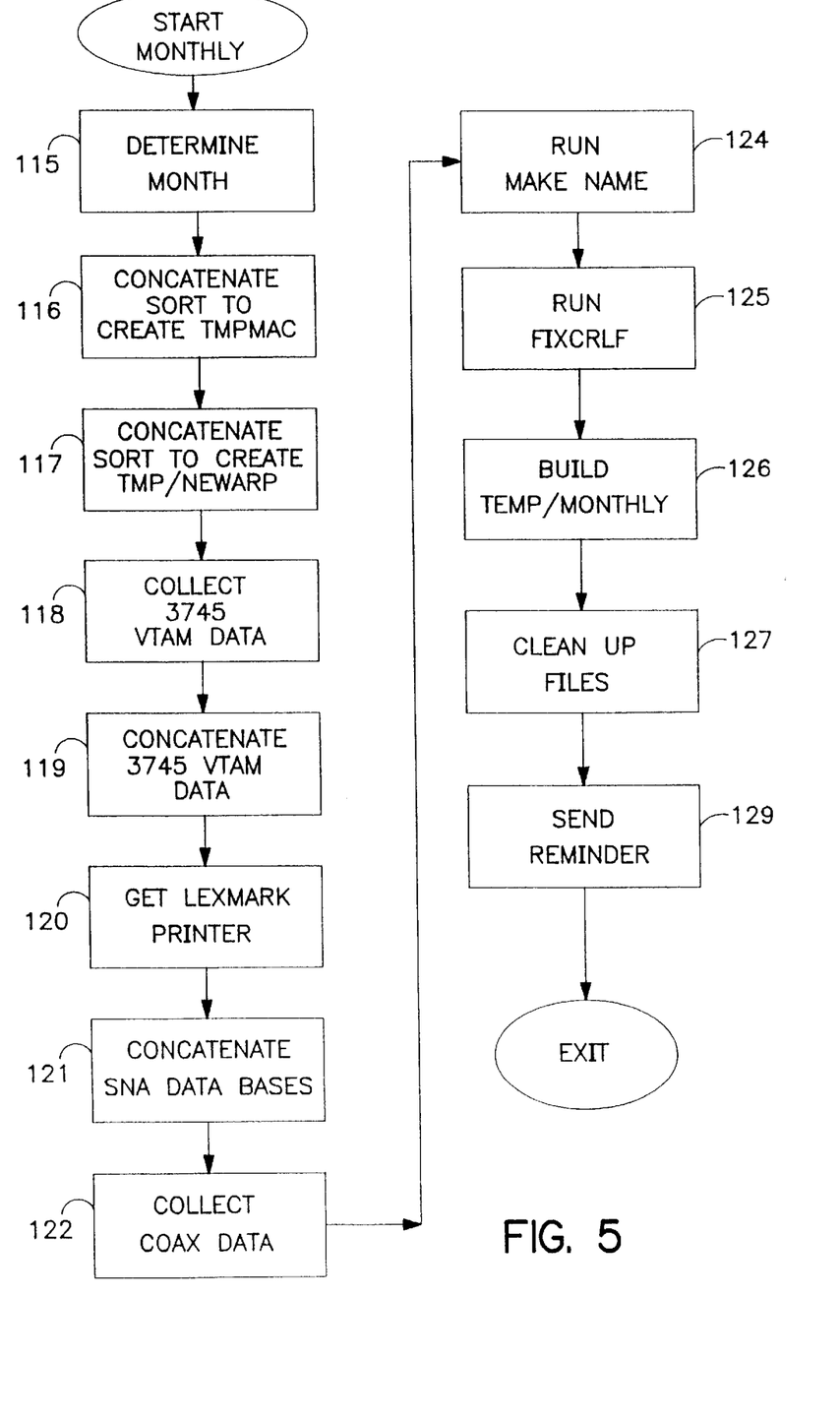
FIG. 5 illustrates the MONTHLY routine which creates a single file from connectivity data obtained by the collection routines.

The collected data is stored using the NFS command on the AIX machine 20 of FIG. 1, as well as the OS/2 machine 18. Once a month the routine of FIG. 5 is run, which sorts and concatenates the information which has been collected. Additionally, it collects from the SNA controller 24 the VTAM data identifying each TCP/IP address of all devices on the SNA network 25.

At the start of each month in step 115, the monthly routine of FIG. 5, is run on the AIX machine 20 which concatenates and stores the files obtained by the collection processes. This includes sorting in step 116 hub list information to create tmt/MAC. In step 117, the NEWARP table containing port data obtained from the various hubs are stored in a temporary file tmp/NEWARP. The information from SNA controller 24 is collected in step 118 and concatenated and stored as a file tmp/VTAM in step 119. The SNA data base files recovered from the routine executed in step 119 are stored as tmp/SNAB.

The collected data is now available on the AIX machine in a format which can be merged with the static data appearing in data bases 31, 32 and 33.

Figure 6:
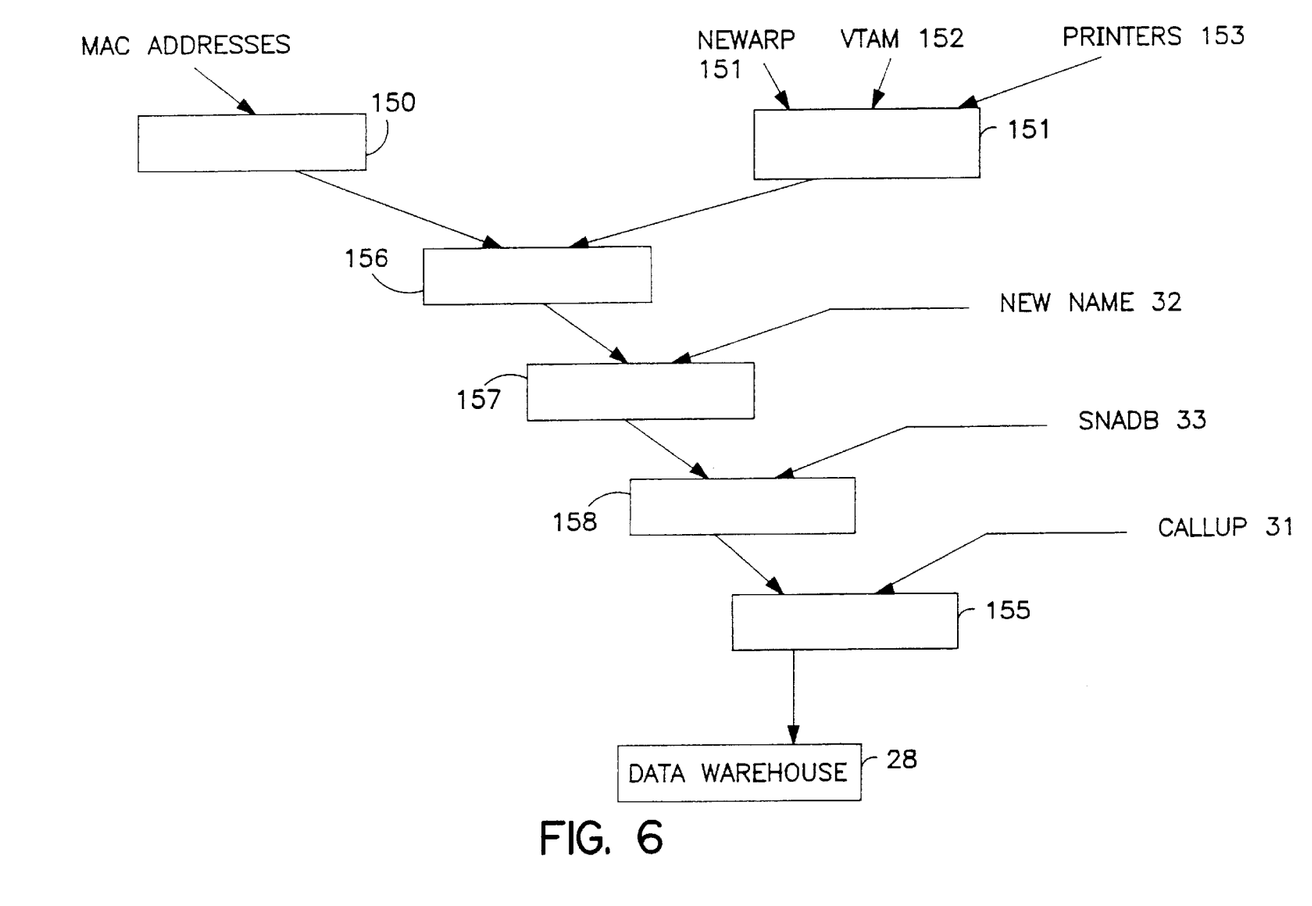
FIG. 6 illustrates the process run on the mainframe computer 26 which merges the connectivity data with static data.

The collected dynamic information constituting the identity of connections to the network is then merged with the static information from data bases 31, 32 and 33 into a single database of data warehouse 28 stored on a main frame computer of the SNA network 25 as shown in FIG. 6. The process combines the connectivity data including MAC address and port connections on all of the hubs, collected in 150 with the NEWARP data from the router, VTAM data from controller 24 and printers 16. The sets of data representing the different devices which have used the network are merged in a single file in step 156 by a process carried out on the main frame machine 26 of the SNA network 28.

The MAC address data collected from the hubs in 150 identifies each user connected to a respective hub. The user information from the hubs is updated in 151 with any information from the NEWARP 151 file, which was recovered from each of the routers. While the NEWARP data may also include addresses which do not appear connected to any hub, these addresses will form a separate record within the merged data file 156.

Additionally, the data recovered from the VTAM controller 24 shown as VTAM 152 will identify the TCP/IP address of those users recovered from the VTAM controller 24 utilized the network. Any SNA identification information such as the SNA XID of the user will be noted for the recovered MAC address.

Other information collected from the network, such as the identification of the connection of printers 27 by their MAC address in 153, is combined with the merged data 156. The merged data 156 represents an inventory of all of the network connected devices stored as records of each MAC address for the device.

The merged connectivity data 156 is then in accordance with the process carried out on the main frame computer 26 merged with data from the main server database 32 in step 157, SNA database 33 in step 158, and the CALLUP database 31 in step 155. The main server database 32 NEWNAME file identifies for each device connected to the network a TCP/IP address as well as the identity of the user. The identity of the user may for instance be an employee serial number and the MAC address for the employee representing his network interface card. The records obtained from merging all the devices in accordance with their MAC address in step 156 is further merged with the employee serial number from the NEWNAME file having the same MAC address as is contained in the NEWNAME file.

The information from the SNA database 33 is then merged with the records merged from the NEWNAME database 32. The merger occurs in step 158 under control of the main frame machine 26. The SNA XID's are checked to identify any MAC address having a SNA XID, as well as other information such as a PU name from the SNA database 33. The SNA database 33 is organized according to the TCP/IP address, and the employee identification number. The SNA database organizes information according to the employee identification number, which is now contained in each record following the merger of the NEWNAME database 32 in step 157. The SNA XID address is therefore included in each record in step 158, along with any other information pertaining to the user stored in the SNA database 33.

Finally, the data contained in the CALLUP database 31 is merged in step 155 with the previous information of the name server database 32, and SNA database 33. The CALLUP database 31 includes records of each employee's serial number, containing the telephone number for the employee, his department or division number, and possibly a supervisor identification. As the records obtained in step 158 include the employee's number as well, they may be updated with employee serial number information to derive a final record in step 155 which is that shown in Table 1 of the present application. The merged information is stored in the data warehouse 28 representing an entire inventory of all devices which are connected to the network. The information may thereafter be used to identify, during any diagnostic troubleshooting the owner of any particular device having a MAC address which presents a problem, as well as the other information for this MAC address, such as its port connection, the identity of the hub or router serving the user, and any other privileges which are noted in the database record. Billing or accountability information may be derived from the data warehouse 28 by sorting in accordance with each employee identification number the number of MAC addresses connected to the network.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for determining connectivity data from a plurality of diverse network terminals connected to an area network comprising:

issuing from a terminal connected to said network a series of inquiries requesting port identification data unique to each of said diverse terminals;

obtaining from a local data base the user identity of each of said terminals from said data obtained from said series of inquiries; and storing in a data warehouse said user identity information from said local data base correlated with said port information derived from said inquiries.

2. The method for determining connectivity data according to claim 1 wherein said diverse network terminals operate with different network protocols.

3. The method according to claim 2 wherein said plurality of diverse network elements includes at least one router which provides information concerning terminals served by said router in response to a Simple Network Management Protocol (SNMP) command.

4. The method according to claim 1 wherein said port identification data includes dynamic data from an SNA network connected to said network identifying the address of terminals which are authorized users of said SNA network.

5. The method according to claim 1 wherein said information stored in said warehouse includes the location of each of said plurality of terminals and a respective segment number of any of said terminals connected to a hub of said network.

6. The method according to claim 1 wherein said series of inquiries are issued as base values of a Simple Management Protocol (SNMP) which results in MAC addresses for each of said terminals.

7. A method for collecting data identifying individual user connections to a network and combining said data with the identity of said users in a data warehouse comprising:

collecting said user identity from a data base associated with said network;

issuing a request over said network for connectivity information contained in each network hub identifying the port location of each connected terminal;

correlating port location information received from said hubs with information obtained from said data base; and storing said information in said data warehouse.

8. The method for collecting data according to claim 7 further comprising issuing a command to each router of said network for the address of users having traffic through said routers.

9. The method for collecting data according to claim 8 wherein said hubs provide information in response to a request which identifies the location, segment number and hub serial number.

10. A method for collecting data for identifying port usage of individual users of a local area network comprising:

issuing commands to each hub of said network which connects to each user terminal to provide the identity of each terminal connected to a port of a respective hub;

collecting said identity of said terminals connected to each of said hubs;

issuing commands to a static data base to obtain data identifying each of said users; and correlating said terminal identity data to each terminal user data and storing said correlated data in a data warehouse.

11. The method for collecting data for identifying port usage according to claim 10 further comprising:

issuing commands to each router in said network to obtain addresses for each of said terminals serviced by said router; and combining said addresses in said data warehouse with the identity of each of said users.

12. The method for collecting data for identifying port usage according to claim 10 further comprising:

issuing a command to a controller of a SNA network for the identity of any user authorized to use said SNA network; and storing in said data warehouse an indication of which users are authorized to use said SNA network.

13. A computer medium containing a program for collecting the identity of each user connected to a port of said network, said program comprising:

instructions for generating commands to collect port connection data of devices connected to said network;

instructions for generating commands to collect data identifying each user of said devices from a static database; and instructions for merging said collected port data with said user data obtained from said static database in a data warehouse, whereby user connection information is available for each network user.

14. The computer medium according to claim 13 further comprising:

a set of instructions for collecting the identity of network terminals which are connected to a SNA network; and a set of instructions for identifying in said data warehouse the identity of users of said network terminals connected to said network who are connected to said SNA network.

15. The computer medium according to claim 13 wherein said instructions for generating commands to collect port connection data recover said port connection data from each hub of said network.

16. A method for merging dynamic network connectivity data with static data relating to users of the network comprising:

periodically collecting dynamic network connectivity data including physical address data of equipment connected to each port of said network using SNMP collection components;

determining from a static data base information for each user having a physical address;

merging said dynamic network connectivity data with said information from said static data base; and storing data merged from said connectivity data with information from said static data base in a data storage warehouse whereby information about each port connection to said network is available.

17. The method according to claim 16 wherein said merged data in said data storage warehouse includes each users name and network address.

18. The method according to claim 16 wherein said data storage includes for each user the port to which a user is connected.

19. The method according to claim 17 wherein said merged data includes the date on which the connectivity data was collected.

20. The method according to claim 16 wherein said connectivity data is collected from collection components executed on a plurality of computers of said network which retrieve connectivity data from different network components.

21. The method according to claim 16 wherein said collection components run on a plurality of computers connected to said network.

* * * * *